Nov. 21, 1961  C. T. ROBERTS  3,009,366
GEARHEAD
Filed Sept. 26, 1960
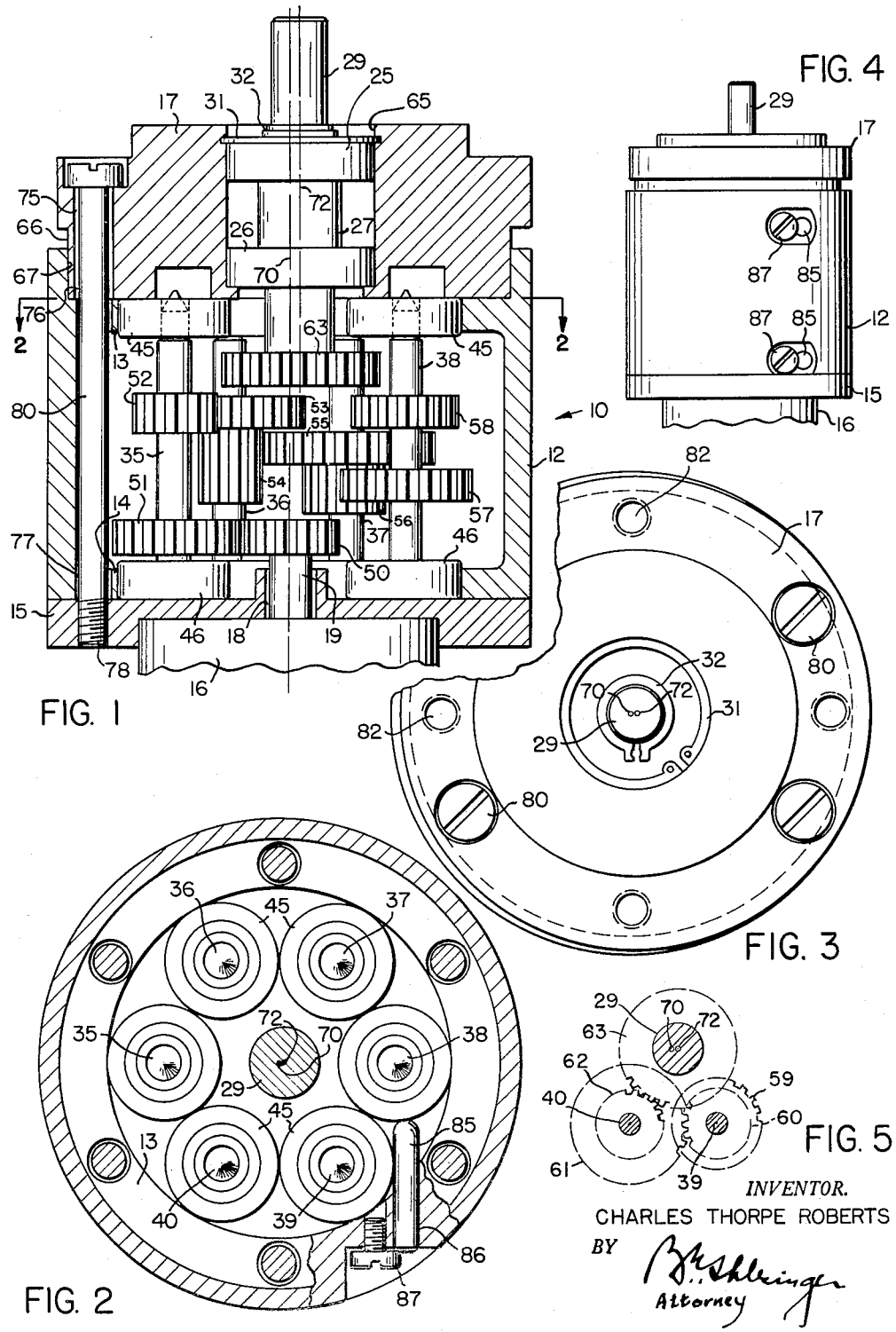
INVENTOR.
CHARLES THORPE ROBERTS
BY
Attorney United States Patent Office 3,009,366
Patented Nov. 21, 1961

3,009,366
GEARHEAD
Charles Thorpe Roberts, Irondequoit, N.Y., assignor to Graflex, Inc., Rochester, N.Y., a corporation of New York
Filed Sept. 26, 1960, Ser. No. 58,239
9 Claims. (Cl. 74—421)

The present invention relates to shaft mountings and more particularly to shaft mountings for gear reducers, especially for combination electric motor-gear reduction units, although it can be applied also to other types of geared speed reducers.

In conventional gearheads bored holes have to be provided for mounting the antifriction bearings for each end of each shaft comprised within the unit. Since sufficient stock has to be left between adjacent bored holes to sustain the webs or ends of the casing, in which the bearings are mounted, the size of the bearings is limited. The bearing size in turn limits the journal sizes of the pinions to diameters so small that for small units great care has to be exercised in hobbing and very light feeds have to be employed to avoid breaking the journals.

One object of the present invention is to provide a gearhead in which the centers on which the gears rotate can be located more precisely than in previously known gearheads.

Another object of the invention is to provide a precision gearhead in which the gear centers can be located precisely with reference to one another without having to precision bore mounting holes for the bearings of the several gear shafts.

Another object of the invention is to provide a gearhead in which larger bearings can be employed for the gear shafts than has heretofore been possible in a gear reduction of a given size.

Still another object of the invention is to provide a gearhead which will be less costly than known gearheads, and in which the different shafts can be quickly and precisely assembled.

Other objects of the invention will be apparent hereinafter from the specification and from the recital of the appended claims.

In the drawing:

FIG. 1 is an axial section of a gearhead made according to one embodiment of this invention;

FIG. 2 is a section through this unit taken on the line 2—2 of FIG. 1 looking in the direction of the arrows;

FIG. 3 is a fragmentary top plan view of this unit;

FIG. 4 is a side elevation of the unit on a reduced scale; and

FIG. 5 is a fragmentary sectional view on a reduced scale, as compared with FIG. 2, and taken in a plane parallel to but below the plane of the section of FIG. 2.

Referring now to the drawing by numerals of reference, 10 denotes the gearhead as a whole. This gearhead comprises a casing 12, which is formed at opposite ends with inwardly projecting webs 13 and 14. It is closed at one end by an adapter 15, which is recessed to receive one end bell of the drive motor 16 of the unit. The adapter seats against the lower face of the web 14. The casing is closed at its opposite end by an end bell or plate 17, which seats on the upper face of the web 13. The adapter 15 has a hole 18 bored centrally through it through which the armature shaft 19 of the motor extends into the casing 12.

Journaled on antifriction bearings 25 and 26 in the end plate 17 is the output shaft 29 of the unit. The bearings 25 and 26 are separated by a spacer 27; and the outer race of bearing 25 is secured in position by snap rings 31 and 32.

Between the input shaft 19 and the output shaft 29 there are interposed the shafts carrying the gearing of the reduction unit. In the instance shown, there are six of these shafts designated 35, 36, 37, 38, 39 and 40, respectively. Each of these shafts is mounted at opposite ends on ball bearings. The ball bearings for the upper ends of the shafts are denoted at 45. The ball bearings for the lower ends of the shafts are denoted at 46. The ball bearings 45 are of uniform size and of such size that they contact with one another and support themselves radially against the inside of the web 13 around the output shaft 29 as shown in FIG. 2. Similarly the ball bearings 46 are of uniform size and of such a size that they contact with one another around the armature shaft 19 and support themselves radially against the inside wall of the web 14.

Secured to the armature shaft 19 of the motor is a drive pinion 50 which meshes with a gear 51 that is fastened to the shaft 35. This shaft, in turn, carries a pinion 52 which meshes with a gear 53 on the shaft 36; and this shaft may carry a pinion 54 that meshes with a gear 55 on the shaft 37; and the shaft 37 may carry a pinion 56 which meshes with the gear 57 on the shaft 38; and this shaft 38 may carry a pinion 58 which meshes with a gear 59 (FIG. 5) on the shaft 39; and the shaft 39 may carry a pinion 60 which meshes with a gear 61 on the shaft 40; and the shaft 40 may carry a pinion 62 which meshes with a gear 63 on the output shaft 29.

Although the invention applies to gearheads of all sizes, additional advantages will be gained by its use for small sized gearheads. Here conventional design, which calls for bored holes for mounting each bearing, limits the size of the bearings that will fit into the available space. Stock must be left in the web between the bored holes sufficient to support the bored web. The bearing size in turn limits journal sizes of pinions to diameters so small that in hobbing the pinions very light feeds must be used to avoid breaking the journals.

With the construction herein described, with the ball races at opposite ends of the shafts in contact with one another, a very precise mounting is possible, because it is possible to buy commercially precision ball bearings with outside diameters held within the tolerance of .0001 inch, which is closer than it is possible economically with the most precise equipment to bore holes for ball bearings. Since by making the ball bearings of a size to contact with one another the boring of holes to receive the ball bearings is eliminated, the ball bearings can be of larger size than ordinarily used. This means that the journal diameters of the shafts can be of larger diameter than ordinarily used; and, in turn, this means that the pinions and gears on the shaft themselves can be of larger diameter than ordinarily used. In turn, this means that the gears can be cut more precisely and faster; and therefore at less cost. Furthermore, the unit described has greater accuracy and greater reliability. Moreover, since the unit described eliminates the drilling of holes for the shaft bearings, it further reduces the overall cost of the unit. With the present invention, then, it is possible to use larger bearings which are less expensive, which will carry heavier torque loads, and permit larger pinion journals.

In order to hold the several ball bearing races at opposite ends of the shafts of the unit against one another and with the thrust in one direction, thrust pins 85 are provided for both the top and lower sets of races. These thrust pins are mounted in aligned holes 86 in the webs 13 and 14, respectively, and are abutted against adjacent races 45 and 46, respectively, and are secured in position by the headed screws 87 which thread into these webs.

While the invention has been described in connection with the use of ball bearings for mounting opposite ends of the shafts of the unit, it will be understood that roller bearings, needle bearings, etc. might also be used instead. It is further to be understood that while the shafts have been shown as mounted at opposite ends in bearings, the invention is applicable also where the shafts are mounted by bearings at one end only. The bearings at the one end would contact one another and bear on a wall of the casing similarly to ball bearings 45 and 46. It is further to be understood that a standard size casing 12 can be used for a gear reduction unit involving as few as two gear meshes, or any number of meshes less than the seven shown, and that in such a case instead of using a plurality of shafts with antifriction bearings for supporting them, only the shaft or shafts required for the desired number of meshes need be employed, and instead of the other shafts and bearings, plain discs or slugs can be used, the discs or slugs replacing the unneeded bearings, and adjacent discs or slugs contacting one another or adjacent bearings as the case may be. Moreover, instead of the bearings or discs being arranged circularly it is within the purview of the invention that they be arranged rectangularly, triangularly, in line etc., depending upon the desired arrangement of the shafts with which they are used, so long as adjacent bearings or discs contact one another and the adjacent wall of the casing or housing, thereby to center one another and the shafts.

The invention is particularly adapted for use in a casing constructed like the casing disclosed in the co-pending application of Milford B. Moore, Serial No. 54,084, filed September 6, 1960, which is owned by the assignee of the present application. This construction is illustrated in FIG. 1 of the drawings of the present application. The end bell or plate 17 has a bore 65 therethrough, in which the bearings 25 and 26 are mounted, which is eccentric of the peripheral surface 66 of the end plate and of the cylindrical guide surface 67 of the casing within which the peripheral surface 66 of the end plate engages.

The shafts 35, 36, 37, 38, 39 and 40 are journaled at opposite ends in the ball bearings 45 and 46, respectively, to be parallel to one another, and are arranged circularly about, and are equi-distant radially from, the axis 70 of the input shaft 19. This axis 70 is also the axis of the surfaces 66 and 67. The axis of the output shaft 29 is denoted at 72.

The end plate 17 has, in the illustrated embodiment of the invention, four bolt holes 75 through it which are spaced from one another and which are arranged concentrically about the axis 70. The webs 13 and 14, and the adapter 15 have six bolt holes each through them which are equi-angularly spaced and arranged on a bolt circle also concentric with the axis 70 and coaxial with the surfaces 66 and 67. The bolt holes in the webs 13 and 14 are denoted at 76 and 77, respectively, while the bolt holes in adapter 15 are designated at 78. Adjustment of end plate 17 angularly in casing 12 permits of adjusting the backlash between gear 63 and the pinion which meshes therewith. Four mounting screws or bolts 80 are used to fasten the end plate 17 in a selected angular position in the housing after adjustment of the end plate. The four bolt holes 75 in the end plate 17 are lined up with four of the six bolt holes in the webs 13 and 14 and the adapter 15; and then the bolts 80 are passed through the aligned bolt holes 76, 77, and threaded into the aligned holes 78 in the adapter 15 to secure the end plate 17, casing 12 and adapter 15 together. The motor 16 can be secured to the adapter 15 by screws or in any other suitable manner.

With the arrangement described, the end plate 17 can have six finite angular positions with respect to the casing. In this way, the distance between the axis 72 of the output shaft 29 and any one of the six shafts 35, 36, 37, 38, 39 and 40 can be varied six times as the end plate is rotatably adjusted through the six possible positions of its connection to the casing.

With this construction it is possible to adjust the end bell or plate 17 so as to take up or control the backlash between the gear 63 on the output shaft 29 and the pinion 62 which meshes therewith, since the rotary adjustment of the end bell or plate 17 provides a means by which the center to center distance between the output shaft and its driving pinion 62 can be adjusted.

Holes 82 are provided in the end plate 17 for securing the gear reduction unit to the apparatus which is to be driven by the output shaft 29.

The preferred structure of the present invention described gives rigidity. The conventional design of gearhead is a plate and post construction in which there are two parallel plates which are separated by four posts and there is a slip-on cover. This cover imparts nothing as regards rigidity. In the preferred design described and illustrated, the end bell or plate 17 has guidance on the inside wall 67 of the housing 12; and therefore the output shaft 29 is rigidly mounted with reference to the other shafts of the reduction unit.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A gear reduction unit comprising a casing, a plurality of shafts journaled at opposite ends on bearings in said casing, said bearings being of a size so that adjacent bearings contact one with another and all said bearings contact the inside of said casing, thereby to locate said shafts radially in said casing, an input shaft and an output shaft extending into said casing, and gearing connecting one, at least, of said plurality of shafts with said input shaft and with said output shaft.

2. A gear reduction unit comprising a casing, a plurality of shafts journaled at opposite ends on antifriction bearings in said casing, said bearings being of a size so that adjacent bearings contact one another and so that all said bearings bear on the inside of said casing thereby to locate said shafts radially in said casing, an input shaft and an output shaft extending into said casing, and gearing connecting one, at least, of said plurality of shafts with said input shaft and with said output shaft.

3. A gear reduction unit comprising a casing, an input shaft extending into said casing at one end thereof, an output shaft extending into said casing at the opposite end thereof, a plurality of shafts arranged with their axes parallel to the axes of both said input and said output shafts, gearing drivingly connecting said input shaft with one of said plurality of shafts, gearing drivingly connecting said plurality of shafts with one another and with said output shaft, each of said plurality of shafts being mounted at opposite ends on bearings, the group of bearings at one end of said plurality of shafts surrounding said input shaft and being of uniform size and all contacting an inside wall of said casing with adjacent such bearings contacting one another, and the group of bearings at the opposite ends of said plurality of shafts surrounding said output shaft and being of uniform size and all contacting an inside wall of said casing, adjacent bearings of the latter group of bearings contacting one another, said inside walls being coaxial with said input shaft.

4. A gear reduction unit as claimed in claim 3 in which said output shaft is journaled in an end plate which closes one end of said casing, and said end plate has a peripheral surface eccentric of the axis of said output shaft, and said peripheral surface contacts around its periphery with an internal surface on said casing which is coaxial with the axis of said peripheral surface, whereby said output shaft is adjusted radially in said casing upon rotary adjustment of said end plate.

5. A gear reduction unit as claimed in claim 3 wherein all said bearings are cylindrical antifriction bearings, and said inside walls are cylindrical.

6. A gear reduction unit as claimed in claim 5 having means in said casing for engaging one bearing of each group of bearings to hold them against revolving in said casing about the axis of said input shaft.

7. A drive comprising a casing having an opening therein and a closed internal wall portion bounding said opening, a pair of shafts, gearing connecting said shafts to drive one from the other, and a plurality of generally cylindrical members, at least one of said shafts being mounted in one of said generally cylindrical members, adjacent cylindrical members being in contact with one another and with said wall portion to center said shafts relative to one another.

8. A drive comprising a casing having an opening therein and aligned, spaced, closed internal wall portions bounding said opening, a pair of shafts, gearing connecting said shafts to drive one from the other, a plurality of generally cylindrical members mounted in said opening adjacent one end of one of said shafts, and a plurality of generally cylindrical members mounted in said opening adjacent the opposite end of said one shaft, adjacent cylindrical members at one end of said one shaft being in contact with one another and with one of said wall portions, and adjacent cylindrical members at the opposite end of said one shaft being in contact with one another and with the other of said wall portions, and said one shaft being mounted adjacent its opposite ends in aligned cylindrical members.

9. A drive comprising a casing having an opening therein bounded by an internal wall, a pair of shafts, gearing connecting said shafts to drive one from the other, and a plurality of generally cylindrical members mounted in said opening, one of said shafts, at least, being mounted in one of said cylindrical members, said one cylindrical member, at least, being an antifriction bearing, adjacent cylindrical members being mounted in contact with one another, and one of said adjacent cylindrical members, at least, being mounted in contact with said wall.

References Cited in the file of this patent
UNITED STATES PATENTS

| | | |
|---|---|---|
| 2,892,357 | Bachman | June 30, 1959 |
| 2,936,644 | Miller | May 17, 1960 |
| 2,943,507 | Bachman | July 5, 1960 |
| 2,950,635 | Bieger et al. | Aug. 30, 1960 |